(12) United States Patent
Yokoyama et al.

(10) Patent No.: US 11,791,588 B2
(45) Date of Patent: Oct. 17, 2023

(54) LIQUID DISCHARGE STRUCTURE

(71) Applicant: Yazaki Corporation, Tokyo (JP)

(72) Inventors: Satoshi Yokoyama, Toyota (JP);
Yusuke Nagai, Toyota (JP); Makoto Goto, Toyota (JP)

(73) Assignee: YAZAKI CORPORATION, Tokyo (JP)

( * ) Notice: Subject to any disclaimer, the term of this patent is extended or adjusted under 35 U.S.C. 154(b) by 567 days.

(21) Appl. No.: 17/089,968

(22) Filed: Nov. 5, 2020

(65) Prior Publication Data

US 2021/0151931 A1    May 20, 2021

(30) Foreign Application Priority Data

Nov. 18, 2019   (JP) ................. 2019-207700

(51) Int. Cl.
| | | |
|---|---|---|
| *H01R 13/46* | (2006.01) | |
| *H01R 13/52* | (2006.01) | |
| *B60R 16/02* | (2006.01) | |
| *B60R 16/023* | (2006.01) | |
| *H01H 85/20* | (2006.01) | |

(52) U.S. Cl.
CPC ..... *H01R 13/5227* (2013.01); *B60R 16/0215* (2013.01); *B60R 16/0238* (2013.01); *H01H 85/20* (2013.01); *H01H 2085/208* (2013.01)

(58) Field of Classification Search
CPC ........................ H01R 13/5227; H01R 13/46; B60R 16/0207; B60R 16/215; B60R 16/02; B60R 16/0232; B60R 16/0238; B60R 16/0239; B60R 16/027; B60R 16/03; B62D 25/24
See application file for complete search history.

(56) References Cited

U.S. PATENT DOCUMENTS

| | | | | |
|---|---|---|---|---|
| 4,609,126 A | * | 9/1986 | Janda ................. | H05K 7/20009 220/374 |
| 5,159,155 A | * | 10/1992 | Nishihara ............ | H05K 5/0212 220/374 |
| 5,703,325 A | * | 12/1997 | Yamaguchi ............ | H02G 3/088 220/804 |

(Continued)

FOREIGN PATENT DOCUMENTS

| | | |
|---|---|---|
| EP | 0930686 A1 | 7/1999 |
| EP | 2144344 A1 | 1/2010 |

(Continued)

*Primary Examiner* — Harshad C Patel
(74) *Attorney, Agent, or Firm* — Sughrue Mion, PLLC

(57) ABSTRACT

A liquid discharge structure includes a bottom wall with a discharge opening for liquid, the liquid being collected inside a casing which is configured to be installed in a vehicle, a blocking wall disposed outside the bottom wall so that the blocking wall is overlapped with the discharge opening in a plan view on the bottom wall and opposed to the bottom wall with a gap, and a pair of vertical walls extending towards the bottom wall from the blocking wall in a front-rear direction of the vehicle, the pair of vertical walls being opposed to each other in a width direction of the vehicle, wherein the pair of vertical walls is configured to define a discharge path together with the bottom wall and the blocking wall, the discharge path being opened towards both of a front and rear side of the vehicle.

7 Claims, 8 Drawing Sheets

(56) References Cited

U.S. PATENT DOCUMENTS

| | | | | |
|---|---|---|---|---|
| 6,166,327 | A * | 12/2000 | Saito | H02G 3/088 |
| | | | | 220/374 |
| 6,982,379 | B2 * | 1/2006 | Saka | H01R 13/5227 |
| | | | | 220/374 |
| 9,463,813 | B2 * | 10/2016 | Gebhard | B61C 3/00 |
| 11,462,895 | B2 * | 10/2022 | Otsuba | H02G 3/16 |
| 11,679,815 | B2 * | 6/2023 | Yokoyama | B62D 25/24 |
| | | | | 296/208 |

FOREIGN PATENT DOCUMENTS

| | | |
|---|---|---|
| JP | 58-138379 U | 9/1983 |
| JP | 2006-254517 A | 9/2006 |

* cited by examiner (FRONT SIDE) ←— —→ (REAR SIDE)

LIQUID DISCHARGE STRUCTURE

BACKGROUND OF THE INVENTION

Technical Field

The present invention relates to a liquid discharge structure which is configured to discharge liquid collected inside a casing installed in a vehicle.

Background Art

Conventionally, e.g. an electrical junction box, such as a relay box, and/or a protector for wire harness protection are installed in a vehicle. In this case, some of such components are intended to be disposed in a lower portion of the vehicle, wherein liquid, such as rain water from the outside of the vehicle and/or washing water, may enter such components in the lower portion. Therefore, a liquid discharge structure is oft provided in a casing, e.g. for an electrical junction box and/or a protector, wherein the liquid discharge structure is configured to discharge liquid collected inside the casing.

Such a liquid discharge structure itself which is provided in the casing may form an access passage for the liquid from the outside. Therefore, a liquid discharge structure is proposed which discharges liquid collected inside the casing and further suppresses liquid being introduced from the outside (e.g. see Patent Document 1). The liquid discharge structure according to this Patent Document 1 has a structure with a discharge opening in a bottom wall of the casing, wherein a tubular coupling section extends downwards from the discharge opening, and a tubular discharge section is provided at a lower end of the coupling section so as to extend intersecting the coupling section. With this liquid discharge structure, each of the tubular coupling and discharge sections can suppress liquid being introduced from the outside by means of their lateral surfaces.

CITATION LIST

Patent Literature

Patent Document 1: JP 2006-254517 A

SUMMARY OF THE INVENTION

However, the liquid discharge structure as described above tends to have a large space for installation of the casing, since this liquid discharge structure is configured with a structure which includes two tubular portions and extends downwards from the casing.

Therefore, the present invention is focused on such a problem, and an objective of the present invention is to provide a liquid discharge structure which can reduce a space for installation of a casing while discharging liquid collected within the casing and suppressing liquid being introduced into a discharge opening from the outside.

In order to achieve the above-mentioned objective, a liquid discharge structure includes a plate-shaped bottom wall with a discharge opening for liquid, the liquid being collected inside a casing which is configured to be installed in a vehicle. The liquid discharge structure further includes a blocking wall outside the bottom wall, wherein the blocking wall is overlapped with the discharge opening in a plan view on the bottom wall and opposed to the bottom wall with a gap between the blocking wall and the bottom wall. The liquid discharge structure further includes a pair of vertical walls extending towards the bottom wall from the blocking wall in a front-rear direction of the vehicle, the pair of vertical walls being opposed to each other in a width direction of the vehicle, wherein the pair of vertical walls is configured to define a discharge path together with the bottom wall and the blocking wall, the discharge path being opened towards both of a front and rear side of the vehicle and configured to discharge the liquid in the front-rear direction, wherein the liquid has passed through the discharge opening.

The liquid discharge structure as described above can discharge liquid collected within the casing by means of the discharge opening in the bottom wall and the discharge path outside the bottom wall. Further, the liquid discharge structure can suppress liquid being introduced from the outside, since the discharge opening is surrounded by the blocking wall and the pair of vertical walls which form the discharge path. In addition, a space for installation of the casing can be reduced, since the discharge path projects from the bottom wall only with an amount which is a distance to an outer surface of the blocking wall opposed to the bottom wall. In this manner, the liquid discharge structure as described above can reduce a space for installation of the casing while discharging liquid collected within the casing and suppressing the liquid entering the discharge opening from the outside.

DETAILED DESCRIPTION OF THE PREFERRED EMBODIMENTS

Hereinafter, embodiments of a liquid discharge structure will be described.

Figure 1:
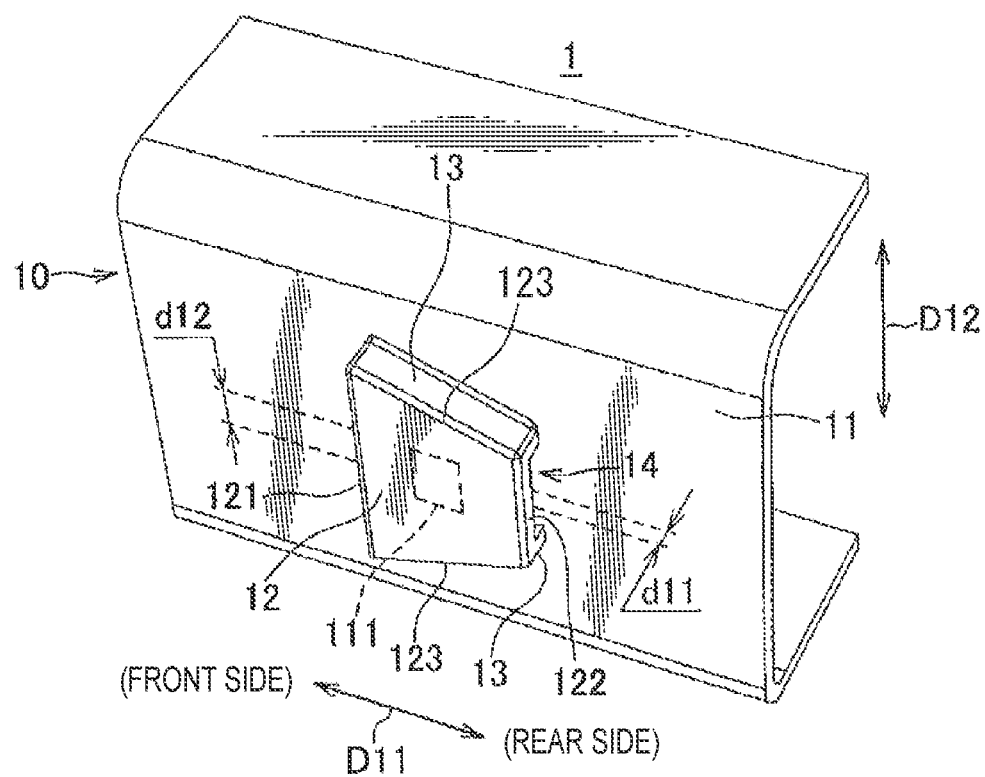
FIG. 1 shows a liquid discharge structure according to an embodiment in a perspective view from the outside of a casing.
Figure 2:
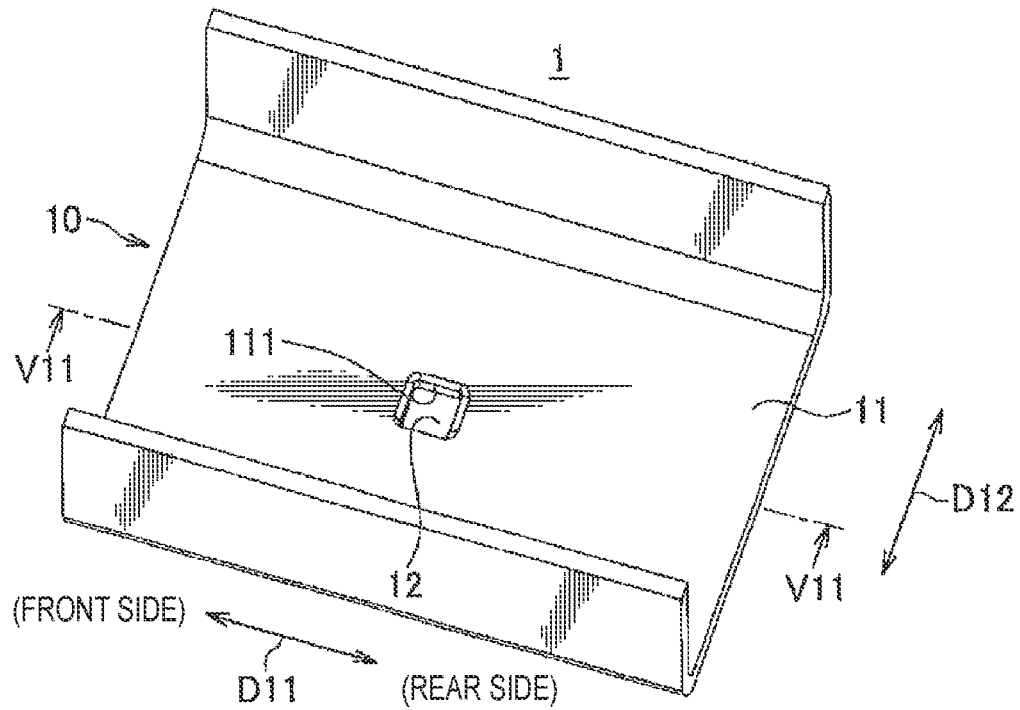
FIG. 2 shows the liquid discharge structure according to FIG. 1 in a perspective view from the inside of the casing.

FIG. 1 shows a liquid discharge structure according to an embodiment in a perspective view from the outside of a casing. FIG. 2 shows the liquid discharge structure according to FIG. 1 in a perspective view from the inside of the casing.

The liquid discharge structure 10 according to FIGS. 1 and 2 is provided in a casing, such as a casing 1, as described below:

As used herein, the casing 1 is a casing for an electrical junction box or a protector to be installed in a vehicle, wherein the electrical junction box provides an electrical connection between wire harnesses or between a wire harness and another electric device, wherein the protector covers a wire harness and protects it, although the casing 1 is not limited here. The liquid discharge structure 10 is a structure for discharging liquid collected within such a casing 1, and includes a bottom wall 11 of the casing 1, a blocking wall 12, and a pair of vertical walls 13. In FIGS. 1 and 2, a right-left direction in the Figures corresponds to a front-rear direction D11 of the vehicle, wherein a left side in the Figures corresponds to a front side of the vehicle, and a right side in the Figure corresponds to a rear side of the vehicle.

The bottom wall 11 is a wall having a flat plate shape, and provided with a discharge opening 111 for liquid which is collected within the casing 1. The blocking wall 12 is a wall having a rectangular plate shape which is disposed outside the bottom wall 11 so that the blocking wall 12 is overlapped with the discharge opening 111 in a plan view on the bottom wall 11 and opposed to the bottom wall 11 with a gap d11 between the blocking wall 12 and the bottom wall 11. The vertical walls 13 extend towards the bottom wall 11 from the blocking wall 12 in a front-rear direction D11 of the vehicle. The vertical walls 13 are provided as a pair and opposed to each other in a width direction D12 of the vehicle, wherein the vertical walls 13 are configured to define a discharge path 14 together with the bottom wall 11 and the blocking wall 12, the discharge path 14 being opened towards both of a front and rear side of the vehicle and configured to discharge the liquid in the front-rear direction D11, wherein the liquid has passed through the discharge opening 111.

The liquid discharge structure 10 as described above can achieve effects as described later. Before describing the effects, a reference for comparison with this liquid discharge structure 10 will be described first.

Figure 3:
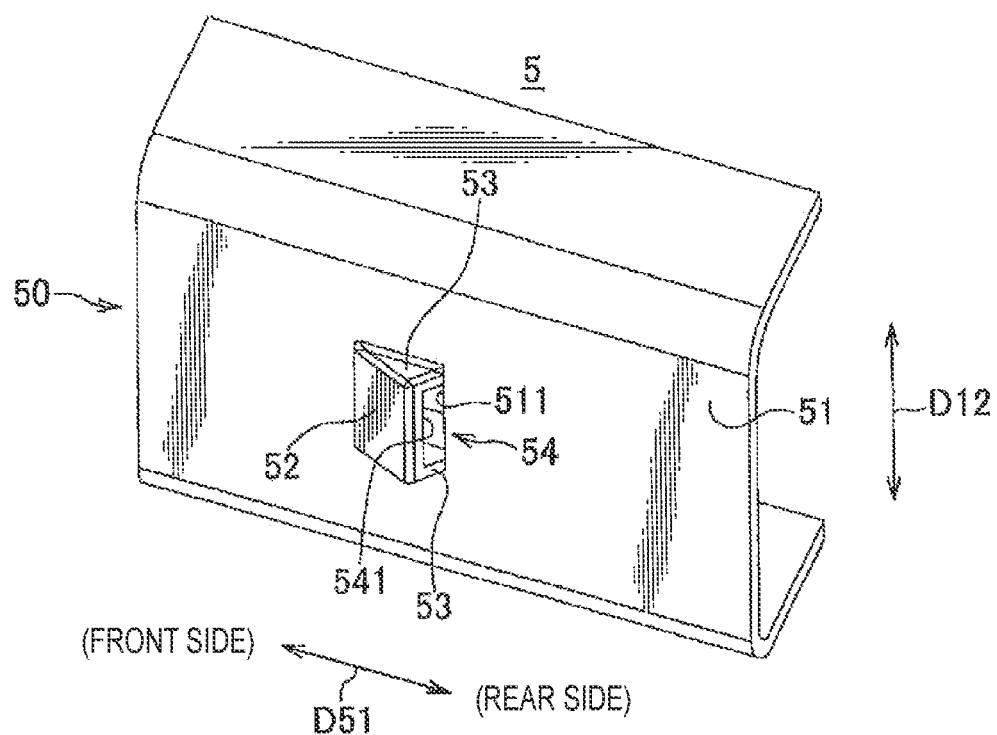
FIG. 3 shows a liquid discharge structure according to a reference for comparison with the liquid discharge structure according to FIGS. 1 and 2 in a perspective view from the outside of the casing.
Figure 4:
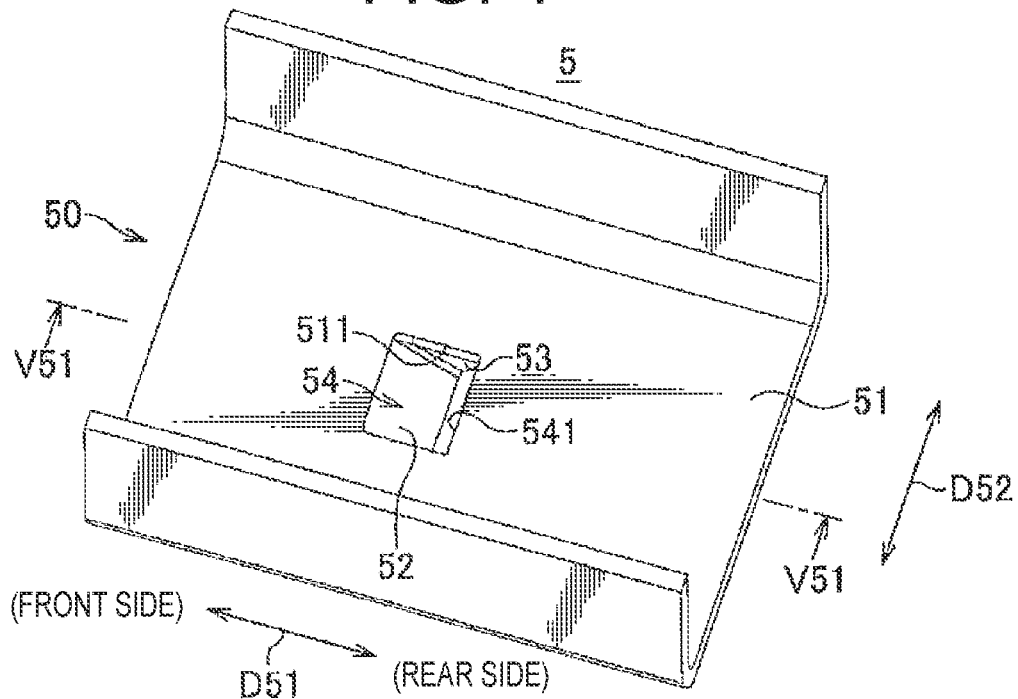
FIG. 4 shows the liquid discharge structure according to the reference as shown in FIG. 3 in a perspective view from the inside of the casing.

FIG. 3 shows a liquid discharge structure according to a reference for comparison with the liquid discharge structure according to FIGS. 1 and 2 in a perspective view from the outside of the casing. FIG. 4 shows the liquid discharge structure according to the reference as shown in FIG. 3 in a perspective view from the inside of the casing. Likewise, a right-left direction in FIGS. 3 and 4 corresponds to a front-rear direction D51 of a vehicle, wherein a left side in the Figures corresponds to a front side of the vehicle, and a right side in the Figures corresponds to a rear side of the vehicle.

Likewise, the liquid discharge structure 50 according to the reference is a structure for discharging liquid collected within a casing 5, the casing 5 being installed in the vehicle, wherein the liquid discharge structure 50 includes a bottom wall 51 of the casing 5, a blocking wall 52, and a pair of vertical walls 53.

The bottom wall 51 is a wall having a flat plate shape, and provided with a discharge opening 511 for liquid which is collected within the casing 5. The blocking wall 52 is a tilted wall extending obliquely externally from the casing 5 with an amount which is gradually increased in the front-rear direction D51 of the vehicle from an edge of the discharge opening 511 towards the rear side of the vehicle, the edge being located towards the front side of the vehicle. The vertical walls 53 are a pair of walls, each of the walls having a triangular shape, wherein the vertical walls 53 connect a pair of inner edges of the discharge opening 511 to a pair of lateral edges of the blocking wall 52, the pair of inner edges of the discharge opening 511 being opposed to each other in a width direction D52 of the vehicle. The blocking wall 52 and the pair of vertical walls 53 define the above-described discharge opening 511 which opens inwardly in the casing 5. As such, a discharge path 54 is defined with an external discharge opening 541 which is oriented externally from the casing 5, wherein the external discharge opening 541 is defined by the blocking wall 52, the pair of vertical walls 53 and an rear end edge of the discharge opening 511. With the liquid discharge structure 50 according to this reference, liquid collected within the casing 5 is discharged, while external liquid is prevented from entering, as described below.

Figure 5:
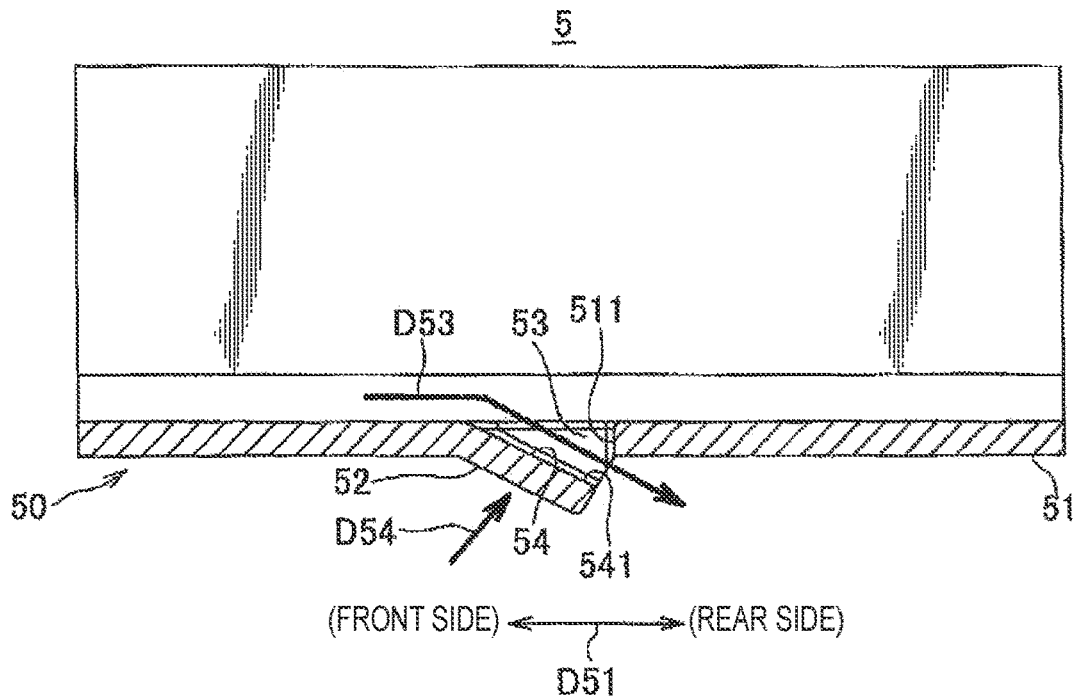
FIG. 5 is a sectional view along the line V51-V51 in FIG. 4 illustrating how liquid is discharged and prevented from being introduced in the liquid discharge structure according to the reference as shown in FIGS. 3 and 4.

FIG. 5 is a sectional view along the line V51-V51 in FIG. 4 illustrating how liquid is discharged and prevented from being introduced in the liquid discharge structure according to the reference as shown in FIGS. 3 and 4. Likewise, a right-left direction in FIG. 5 corresponds to the front-rear direction D51 of the vehicle, wherein a left side in the figure corresponds to the front side of the vehicle, and right side in the figure corresponds to the rear side of the vehicle.

In the liquid discharge structure 50 according to the reference, liquid collected within the casing 5 flows through the discharge opening 511 in the bottom wall 51 into the discharge path 54, as indicated by an arrow D53. Then, the liquid flows through this discharge path 54 from the front side to the rear side with regard to the front-rear direction D51 of the vehicle and is discharged through the external discharge opening 541 to the rear side. In the liquid discharge structure 50 according to this reference, liquid attempts to enter from the front side of the vehicle, as indicated by an arrow D54, wherein the liquid is prevented from entering the casing 5 by blocking the liquid with the blocking wall 52 and the pair of vertical walls 53.

Figure 6:
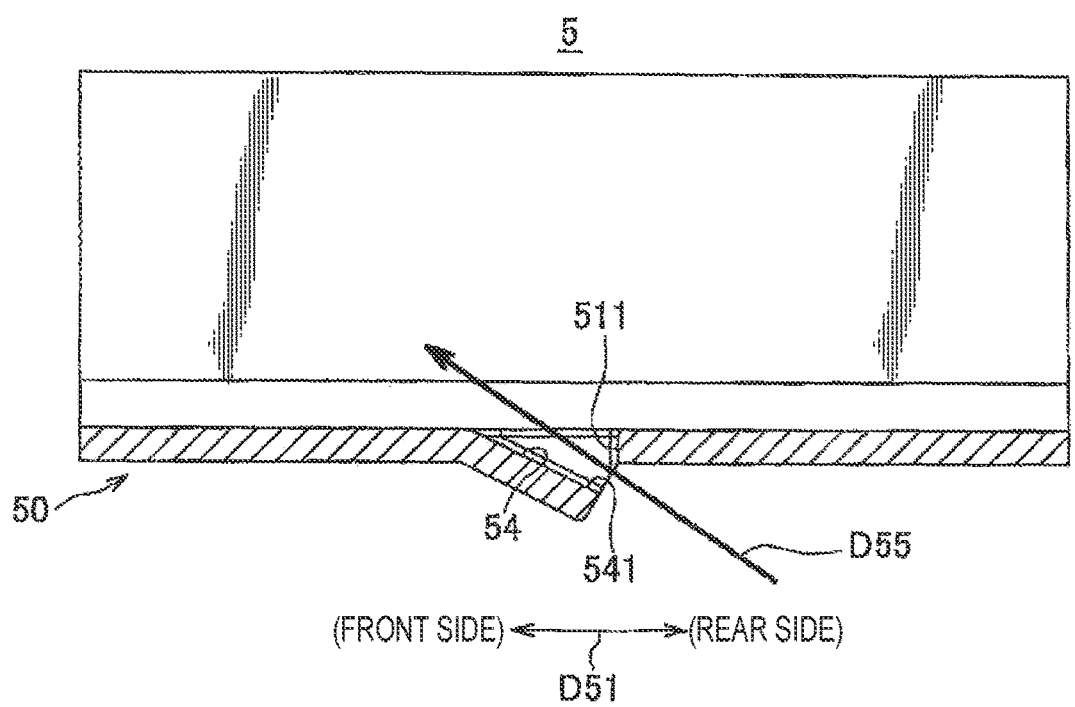
FIG. 6 is a sectional view similar to FIG. 5, wherein it is shown that there is a room for improvement in view of suppressing liquid entering from the outside in the liquid discharge structure according to the reference as shown in FIGS. 3 and 4.

It can be seen that the liquid discharge structure 50 according to the reference has room for further improvement of the discharge capacity, since the liquid discharge is limited to discharge towards the rear side of the vehicle. Also in view of suppressing liquid entering from the outside, there is also room for improvement as follows:

FIG. 6 is a sectional view similar to FIG. 5, wherein it is shown that there is a room for improvement in view of suppressing liquid entering from the outside in the liquid discharge structure according to the reference as shown in FIGS. 3 and 4. Likewise, a right-left direction in FIG. 6 corresponds to the front-rear direction D51 of the vehicle, wherein a left side in the figure corresponds to the front side of the vehicle, and right side in the figure corresponds to the rear side of the vehicle.

As mentioned above, with the liquid discharge structure 50 according to the reference, it is prevented that liquid enters the casing 5 from the front side of the vehicle with regard to the front-rear direction D51. On the other hand, liquid coming from the rear side may be allowed to enter the casing 5 via the external discharge opening 541, the discharge path 54, and the discharge opening 511, as indicated by an arrow D55. As such, it can be also seen that the liquid discharge structure 50 according to the reference has room for further improvement in view of suppressing liquid entering from the outside.

Figure 7:
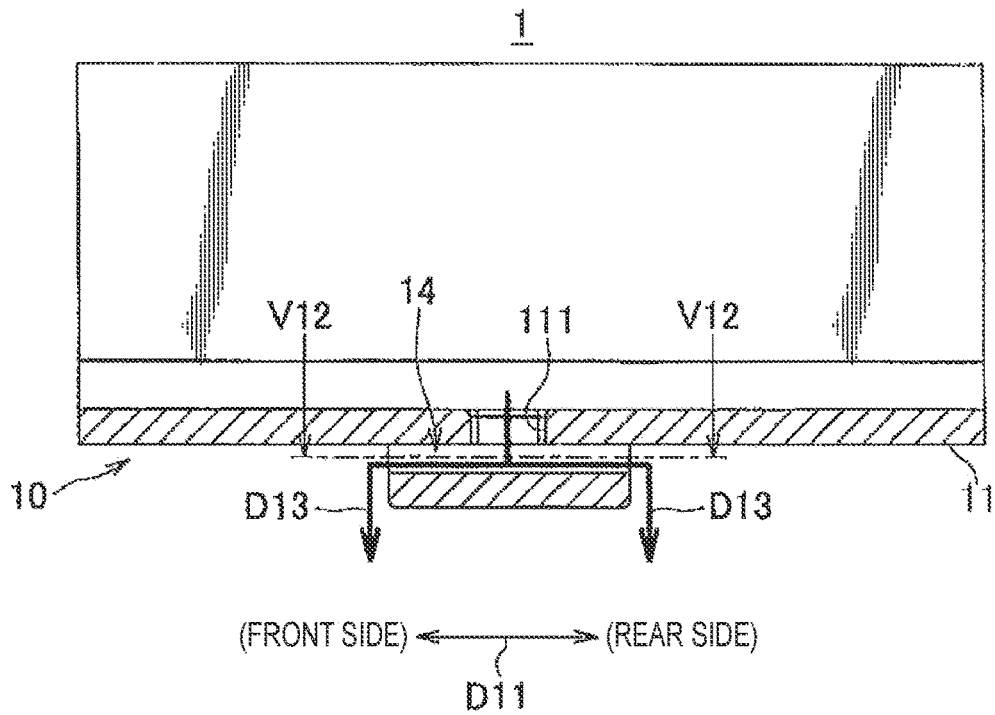
FIG. 7 is a sectional view along the line V11-V11 in FIG. 2 illustrating how the discharge capacity for liquid is increased in the liquid discharge structure according to FIGS. 1 and 2.

In contrast, the liquid discharge structure 10 as shown in FIGS. 1 and 2 can achieve effects as described below. First, the liquid discharge structure 10 can achieve improvement effects in view of the liquid discharge capacity as follows:

FIG. 7 is a sectional view along the line V11-V11 in FIG. 2 illustrating how the discharge capacity for liquid is increased in the liquid discharge structure according to FIGS. 1 and 2. Likewise, a right-left direction in FIG. 7 corresponds to a front-rear direction D11 of the vehicle, wherein a left side in the Figure corresponds to a front side of the vehicle, and a right side in the Figure corresponds to a rear side of the vehicle.

This liquid discharge structure 10 enables liquid collected within the casing 1 to be discharged as indicated by arrows D13 by means of the discharge opening 111 in the bottom wall 11 and the discharge path 14 outside the bottom wall 11. I.e., the liquid can be discharged through both of the front and rear openings of the discharge path 14 with regard to the front-rear direction D11 of the vehicle. This means that the liquid discharge structure 10 can improve the discharge capacity for liquid better than the liquid discharge structure 50 according to the reference as shown in FIGS. 3 to 6.

Figure 8:
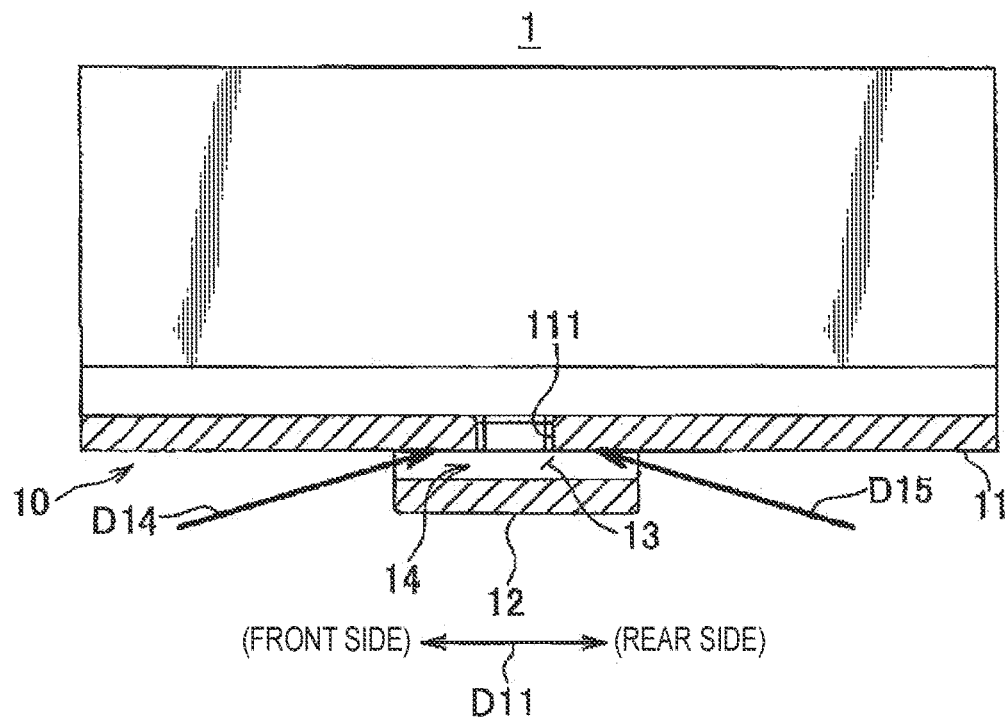
FIG. 8 is a sectional view similar to FIG. 7, wherein it is shown how the suppression capacity for liquid being introduced from the outside is increased in the liquid discharge structure according to FIGS. 1 and 2.

Furthermore, the liquid discharge structure 10 can achieve improvement effects in view of suppressing liquid entering from the outside as follows:

FIG. 8 is a sectional view similar to FIG. 7, wherein it is shown how the suppression capacity for liquid being introduced from the outside is increased in the liquid discharge structure according to FIGS. 1 and 2. Likewise, a right-left direction in FIG. 8 corresponds to the front-rear direction D11 of the vehicle, wherein a left side in the Figure corresponds to the front side of the vehicle, and the right side in the Figure corresponds to a rear side of the vehicle.

According to this liquid discharge structure 10, the discharge opening 111 is surrounded by the blocking wall 12 and the pair of vertical walls 13 which form the discharge path 14, which enables liquid from the outside to be prevented from entering the casing 1, as indicated by arrows D14 and D15. I.e., the liquid intrusion can be suppressed on both of the front and rear side of the vehicle with regard to the front-rear direction D11. This means that the liquid discharge structure 10 can improve the capacity of suppressing liquid entering from the outside better than the liquid discharge structure 50 according to the reference as shown in FIGS. 3 to 6.

In addition to the fact that the improvement effects can be achieved for the capabilities of liquid discharge and of suppressing liquid entering from the outside in this manner, the liquid discharge structure 10 as shown in FIGS. 1 and 2 can achieve the effect of reduction in a space for installation of the casing 1. This means that according to the liquid discharge structure 10, an amount of projection d12 of the discharge path 14 from the bottom wall 11 (FIG. 1) extends only to an outer surface of the blocking wall 12 opposed to bottom wall 11, which can reduce the space for installation of the casing 1. In this manner, the liquid discharge structure 10 can reduce the space for installation of the casing 1 while discharging liquid collected within the casing 1 and suppressing liquid entering from the outside.

According to the present embodiment, the discharge path 14 is configured in the form of a tapered path with an extension in the width direction D12 of the vehicle, wherein the extension in the width direction D12 is gradually reduced from the front side to the rear side of the vehicle. Such a discharge path 14 is formed by the blocking wall 12 and the pair of vertical walls 13, wherein the blocking wall 12 is formed in a trapezoid plate shape with a long side 121 located facing the front side of the vehicle and a short side 122 oriented facing the rear side of the vehicle, wherein the pair of vertical walls 13 is configured as walls which each connects one of a pair of lateral sides 123 of the blocking wall 12 to the bottom wall 11.

With such a configuration regarding the discharge path 14, further improvement effects can be achieved with regard to the discharge capacity for liquid.

Figure 9:
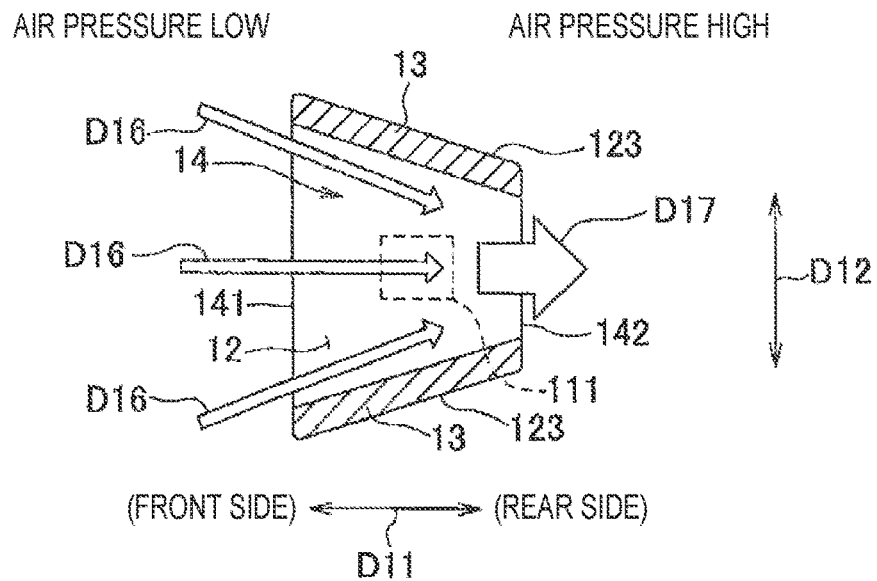
FIG. 9 is a sectional view along the line V12-V12 in FIG. 7 illustrating how the discharge capacity for liquid is increased with the liquid discharge structure according to FIG. 1 due to a discharge path in the form of a tapered path.

FIG. 9 is a sectional view along the line V12-V12 in FIG. 7 illustrating how the discharge capacity for liquid is increased with the liquid discharge structure according to FIG. 1 due to a discharge path in the form of a tapered path. Likewise, a right-left direction in FIG. 9 corresponds to the front-rear direction D11 of the vehicle, wherein a left side in the Figure corresponds to the front side of the vehicle, and the right side in the Figure corresponds to a rear side of the vehicle.

With the discharge path 14 which is configured as a tapered path, when driving the vehicle, air is introduced through a front opening 141 of the discharge path 14 in the front-rear direction D11 and flows through the discharge path 14 to its rear opening 142 under compression, as indicated by arrows D16 an D17. Then, the air is blown out of the rear opening 142 of the discharge path 14 at an increased air pressure. Such a flow of air acts to press liquid to the outside through the rear opening 142, the liquid having entered the discharge path 14 through the discharge opening 111, which can improve the discharge capacity for liquid.

Furthermore, with the vertical walls 13 provided on the lateral sides 123 of the blocking wall 12 in the form of a trapezoid plate shape as described above, the present embodiment can optimally utilize an area of the blocking wall 12 in a plan view to ensure an extension of the vehicle in the width direction D12 and to obtain the discharge path 14 in the form of a tapered path at the same time.

Further, the gap d11 between the blocking wall 12 and the bottom wall 11 according to the present embodiment is smaller than a dimension of the blocking wall 12 in the width direction D12. More specifically, this gap d11 has a substantially same extension as a wall thickness of the blocking wall 12. This configuration can further reduce the amount of projection d12 of the discharge path 14 from the bottom wall 11 so that the space for installation of the casing 1 can be further reduced.

Furthermore, the blocking wall 12 according to the present embodiment is arranged opposed to the bottom wall 11 so that a central portion of the blocking wall 12 is overlapped with the discharge opening 111 in a plan view on the bottom wall 11. With this configuration, the discharge path 14 is arranged so that the discharge opening 111 in the bottom wall 11 is located farthest from the openings 141 and 142 of the discharge path 14, which can further suppress liquid entering from the outside.

Moreover, according to the present embodiment, the bottom wall 11, the blocking wall 12 and the pair of vertical walls 13 are integrally moulded from resin. This configuration can reduce the number of components for the casing 1 including the liquid discharge structure 10, which can reduce the component costs for the casing 1.

Moreover, according to the present embodiment, the casing 1 in which the liquid discharge structure 10 may be installed is a casing for an electrical junction box or for a protector for a wire harness. With this configuration, the above-described liquid discharge structure 10 is applied to a casing for an electrical junction box or a protector which is oft disposed in a lower portion of a vehicle and thus subject to liquid intrusion from the outside. With such application, the effects and the capacities of this liquid discharge structure 10 can be utilized effectively.

It is to be noted that the embodiment as described above merely shows representative configurations for the liquid discharge structure, and the liquid discharge structure is not limited thereto, wherein various modifications may be carried out for implementation.

For example, the embodiment as described above schematically shows the casing 1 and omit description e.g. of its detailed shape. However, any concrete shape of a casing may be used which includes a bottom wall having a plate shape with a discharge opening for liquid.

Furthermore, the embodiment as described above shows the discharge path 14 in the form of a tapered path by way of example. However, the discharge path is not limited to the tapered form, but may have any form which is defined by the blocking wall and the pair of vertical walls, such as a form of a rectangular path. However, as described above, the configuration of the discharge path 14 in the form of tapered path can further improve the discharge capacity for liquid.

Further, the present embodiment shows the discharge path 14 by way of example which is configured in the form of tapered path with the vertical walls 13 arranged vertically on the lateral sides 123 of the blocking wall 12 having a trapezoid plate shape. However, the configuration of the discharge path in the form of tapered path is not limited thereto, but it may be configured that e.g. a pair of vertical walls are arranged opposed to each other at a blocking wall with a rectangular plate shape so that a distance between the vertical walls is gradually reduced from the front side to the rear side of the vehicle. However, as described above as well, the configuration with the blocking wall 12 having a trapezoid plate shape and with the vertical walls 13 arranged on the lateral sides 123 of the blocking wall 12 can obtain the discharge path 14 in the form of tapered path while ensuring an extension of the blocking wall in the width direction D12.

Furthermore, the present embodiment as described above shows by way of example the gap d11 between the blocking wall 12 and the bottom wall 11 which is smaller than the dimension of the blocking wall 12 in the width direction D12 and has substantially the same extension as the wall thickness of the blocking wall 12. However, the gap between the blocking wall and the bottom wall is not limited thereto, but may be configured with any extension. However, as described above as well, the space for installation of the casing 1 can be further reduced by the gap d11 between the blocking wall 12 and the bottom wall 11 which is smaller than the dimension of the blocking wall 12 in the width direction D12.

Moreover, the present embodiment as described above shows by way of example that the central portion of the blocking wall 12 is overlapped with the discharge opening 111. However, any concrete position relation is possible between the blocking wall and the discharge opening as far as the blocking wall and the discharge opening are overlapped with each other in a plan view. However, as described above as well, liquid entering from the outside can be further suppressed by the arrangement of the central portion of the blocking wall 12 overlapped with the discharge opening 111.

Moreover, the present embodiment as described above shows by way of example that the bottom wall 11, the blocking wall 12 and the pair of vertical walls 13 are integrally moulded from resin. However, the configuration of the bottom wall, the blocking wall and the pair of vertical walls is not limited thereto, but may be formed e.g. separately from each other and combined by means of adhesive or the like. However, as described above as well, the integral moulding can reduce the number of components and thus the component costs.

Moreover, the embodiment as described above shows by way of example that the casing 1 is a casing for an electrical junction box or a protector for protecting a wire harness. However, the casing may be configured for any concrete element as far as it is to be installed in a vehicle. However, by applying the liquid discharge structure 10 to an electrical junction box and/or a protector which is subject to liquid intrusion from the outside, it is possible to effectively utilize the effects and capacities of the liquid discharge structure 10, as described above as well.

Next, a liquid discharge structure according to a reference example will be described.

Figure 10:
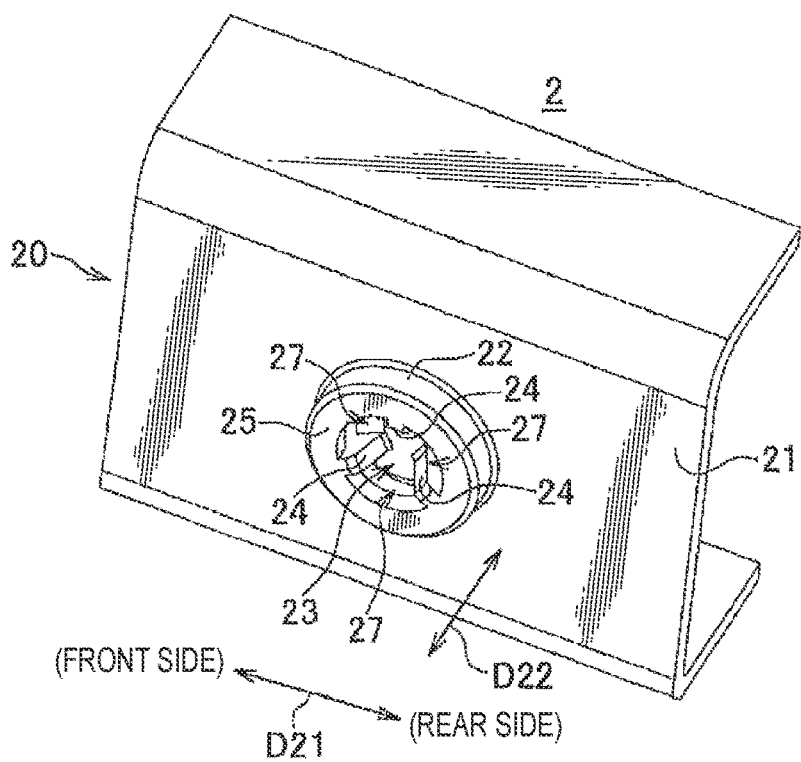
FIG. 10 shows a liquid discharge structure according to a reference example in a perspective view from the outside of a casing.
Figure 11:
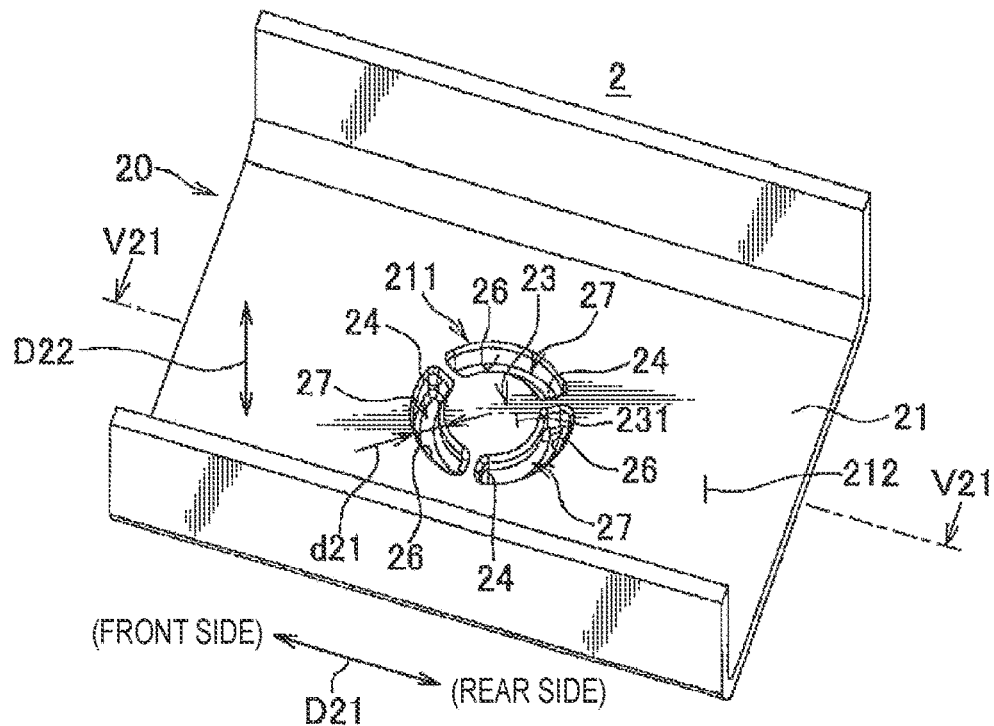
FIG. 11 shows the liquid discharge structure according to FIG. 10 in a perspective view from the inside of the casing.
Figure 12:
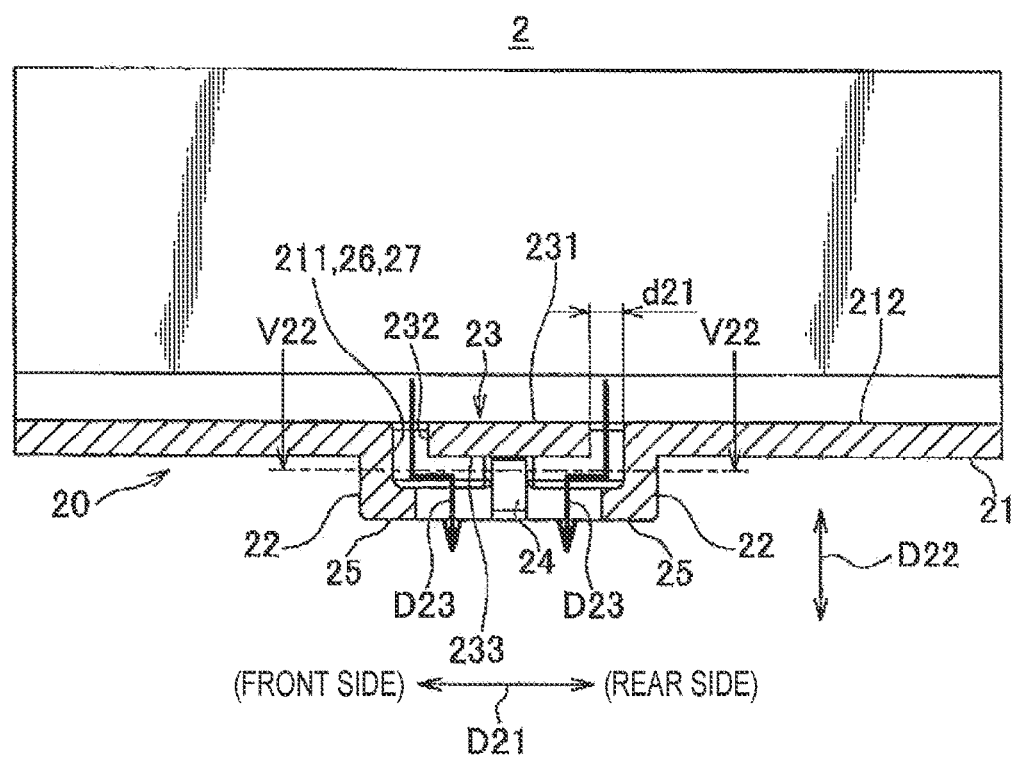
FIG. 12 is a sectional view of the liquid discharge structure according to FIGS. 10 and 11 along the line V21-V21 in FIG. 11.
Figure 13:
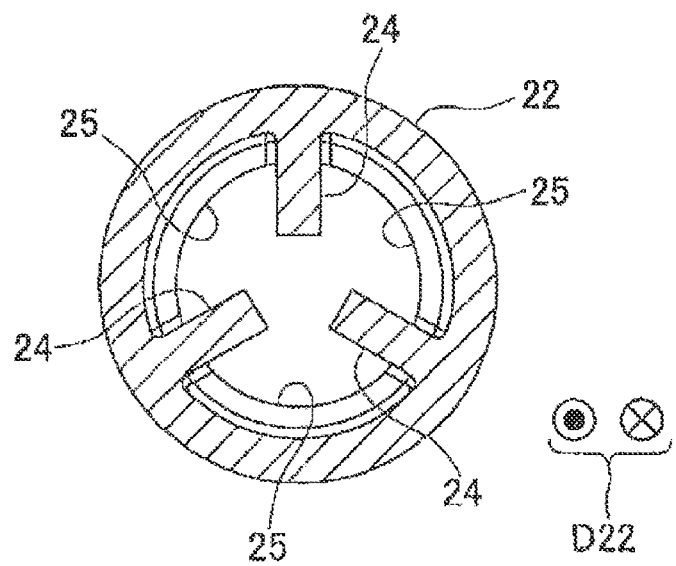
FIG. 13 is a sectional view of the liquid discharge structure according to FIGS. 10 to 12 along the line V22-V22 in FIG. 12.

FIG. 10 shows a liquid discharge structure according to the reference example in a perspective view from the outside of a casing. FIG. 11 shows the liquid discharge structure according to FIG. 10 in a perspective view from the inside of the casing. FIG. 12 is a sectional view of the liquid discharge structure according to FIGS. 10 and 11 along the line V21-V21 in FIG. 11. FIG. 13 is a sectional view of the liquid discharge structure according to FIGS. 10 to 12 along the line V22-V22 in FIG. 12. Likewise, a right-left direction in the FIGS. 10 to 12 corresponds to a front-rear direction D21 of the vehicle, wherein a left side in the Figures corresponds to a front side of the vehicle, and a right side in the Figures corresponds to a rear side of the vehicle.

Likewise, the liquid discharge structure 20 according to the reference example is a structure for discharging liquid collected within a casing 2, the casing 2 being installed in the vehicle, wherein the liquid discharge structure 20 includes a bottom wall 21 of the casing 2, a tubular wall 22, a lid wall 23, rib walls 24 and an overhang wall 25.

The bottom wall 21 is a wall portion having a flat plate shape which is with a through-hole 211. The tubular wall 22 is a portion which is arranged in a tubular shape vertically on an outer surface of the bottom wall 21 so that the tubular wall 22 includes the through-hole 211 as its one opening. The lid wall 23 is arranged inside the through-hole 211 so that one face 231 of the lid wall 23 coincides with an inner surface 212 of the bottom wall 21 and there are gaps d21 between the lid wall 23 and an inner circumferential edge of the through-hole 211, wherein the lid wall 23 is a portion which defines the gaps d21 as discharge openings 26 for liquid collected within the casing 2. The rib walls 24 extend inwardly from an inner lateral surface of the tubular wall 22, wherein at least one rib wall 24, three rib walls 24 in the present reference example, extends in an axial direction D22 of the tubular wall 22 and supports the lid wall 23 inside the through-hole 211. The overhang wall 25 overhangs in a ring shape inwardly from an inner circumferential edge of an opening of the tubular wall 22 which is opposite to the opening with the lid wall 23 arranged therein, wherein the overhang wall 25 defines a labyrinth-like discharge path 27 together with the tubular wall 22. As used herein, the term "labyrinth-like discharge path" 27 refers to a path configured to conduct in the axial direction D22 liquid which has passed through the discharge openings 26, then conduct it further inwardly inside the tubular wall 22 and discharge it, as indicated by arrows D23 in FIG. 12.

All of the three rib walls 24 extend from an inner circumferential edge of the overhang wall 25 to the inner circumferential edge of the through-hole 211 and across an overall length of the tubular wall 22 in the axial direction D22, wherein the rib walls 24 support the lid wall 23 from its outer circumference 232 to an opposite face 233 of the lid wall 23 which is opposite to the one face 231 as mentioned above. Additionally, each of the rib walls 24 is formed in a tapered shape with an amount of overhang which is gradually reduced from a side closer to the through-hole 211 towards the overhang wall 25, as shown in FIG. 10.

Furthermore, according to the present reference example, the through-hole 211 is a circular through-hole, the tubular wall 22 is formed in a cylindrical shape, the lid wall 23 is formed in a circular-disk shape, and the overhang wall 25 is formed in a circular-ring shape. The bottom wall 21, the tubular wall 22, the lid wall 23, the rib walls 24 and the overhang wall 25 are integrally moulded from resin.

Likewise, the casing 2 according to the present reference example is a casing for an electrical junction box or a protector for protecting a wire harness.

The liquid discharge structure according 20 to the reference example as described above enables liquid collected within the casing 2 to be discharged with the discharge openings 26 defined by the lid wall 23 and the through-hole 211 in the bottom wall 21 as well as with the discharge paths 27 outside the discharge path 27. Moreover, the tubular wall 22 and the overhang wall 25 defining the discharge path 27 in the form of a labyrinth can suppress liquid entering from the outside.

According to the present embodiment, the discharge path 27 in the form of a labyrinth can further narrow a range of angle which allows liquid to enter from the outside, as described below.

Figure 14:
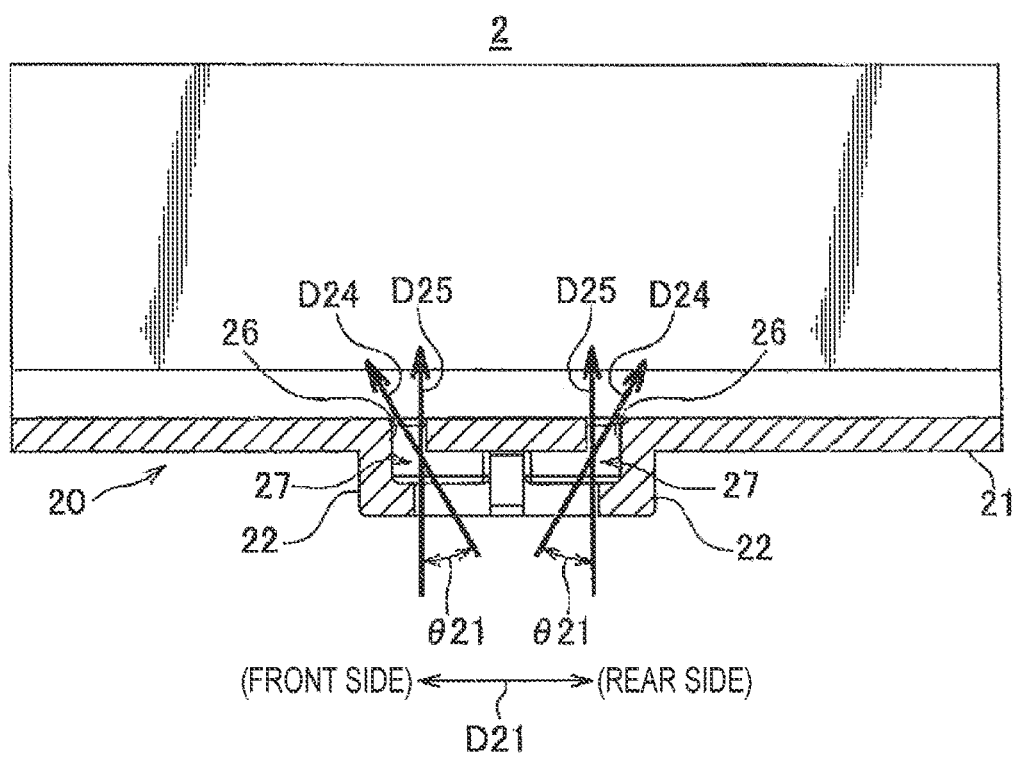
FIG. 14 is a sectional view similar to FIG. 12 illustrating how a range of angle allowing liquid entering from the outside is narrowed with the liquid discharge structure according to FIGS. 10 to 13 due to a discharge path in the form of a labyrinth.
Figure 15:
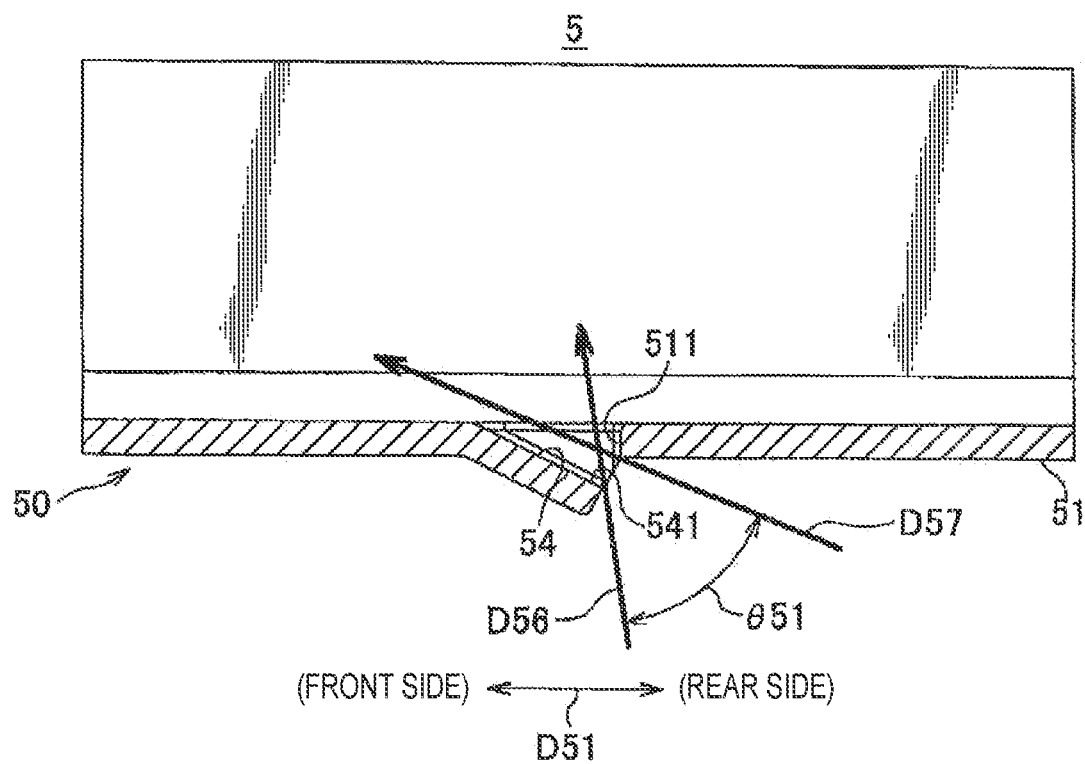
FIG. 15 is a sectional view similar to FIGS. 5 and 6 illustrating how a range of angle allowing liquid intrusion is broader with the liquid discharge structure according to the reference as shown in FIGS. 3 to 6 in comparison with the range of angle for liquid intrusion of the liquid discharge structure according to FIG. 14.

FIG. 14 is a sectional view similar to FIG. 12 illustrating how a range of angle allowing liquid entering from the outside is narrowed with the liquid discharge structure according to FIGS. 10 to 13 due to the discharge path in the form of a labyrinth. FIG. 15 is a sectional view similar to FIGS. 5 and 6 illustrating how a range of angle allowing liquid intrusion is broader with the liquid discharge structure according to the reference as shown in FIGS. 3 to 6 in comparison with the range of angle for liquid intrusion of the liquid discharge structure according to FIG. 14. Likewise, a right-left direction in FIGS. 14 and 15 corresponds to the front-rear direction D11, D51 of a vehicle, wherein a left side in the Figures corresponds to a front side of the vehicle, and a right side in the Figures corresponds to a rear side of the vehicle.

First, for the liquid discharge structure 50 according to the reference as shown in FIG. 15, a range of angle θ51 is increased in which liquid enters the casing 5 from the rear side of the vehicle via the external discharge opening 541 of the discharge path 54 and via the discharge opening 511 in the bottom wall 51, as indicated by arrows D56 and D57. In contrary, for the liquid discharge structure 20 as shown in FIG. 14, the discharge path 27 in the form of a labyrinth limits a range which allows liquid to enter the casing 2 through the discharge openings 26 in the bottom wall 21 from the outside, as indicated by arrows D24 and D25. With the limitation, a range of angle θ21 which allows liquid entering from the outside is narrowed in comparison with the range of angle θ51 for the liquid discharge structure 50 according to the reference as shown in FIG. 15. In this manner, the narrowed range of angle θ21 which allows liquid to enter from the outside can suppress liquid entering from the outside.

In addition, the present reference example can minimize an amount of projection of the tubular wall 22 from the bottom wall 21 as necessary to define the discharge path 27 in the form of a labyrinth, which can reduce a space for installation of the casing 2. In this manner, the liquid discharge structure 20 as described above can reduce the space for installation of the casing 2 while discharging liquid collected within the casing 2 and suppressing the liquid entering the discharge opening from the outside.

Here, unlike the above described liquid discharge structure 20, it is also possible to define the discharge path in the form of a labyrinth by arranging the lid wall 23 more externally than the inner surface 212 of the bottom wall 21. However, in this case, liquid which has passed the through-hole 211 in the bottom wall 21 tends to be collected on the lid wall 23. In contrary, according to the liquid discharge structure 20 as described above, the lid wall 23 is arranged so as to coincide the inner surface 212 of the bottom wall 21 with the one face 231 of the lid wall 23 so that liquid is discharged by passing through the discharge openings 26 between the lid wall 23 and the through-hole 211 in the bottom wall 21, wherein no liquid may be collected on the lid wall 23. Also in this point, the liquid discharge structure 20 as described above can increase the discharge capacity for liquid.

Further, according to the present reference example, by supporting the lid wall 23 by means of the rib walls 24 from the outer circumference 232 to the above-mentioned opposite face 233, it is possible to increase the supporting strength for the lid wall 23, i.e. the structural strength of the liquid discharge structure 20. Additionally, liquid which attempts to enter the discharge openings 26 through the inside of the ring-shaped overhang wall 25 is blocked with high reliability by the rib walls 24 extending across the overall length of the tubular wall 22. This can further suppress liquid entering from the outside.

Moreover, with the rib walls 24 in the form of a tapered wall according to the present reference example, it is possible to reduce an amount of material for forming the rib walls 24 and thus the material costs while ensuring the functionality of the rib walls 24.

Further, according to the reference example, with the tubular wall 22 having a cylindrical shape, it is possible to increase the durability against external pressures, e.g. due to liquid blown from the outside. It is also possible to configure the through-hole 211, the lid wall 23 and the overhang wall 25 in a circular shape for adapting them to the tubular wall 22, wherein an inner space of the tubular wall 22 can be effectively utilized as a discharge path.

Furthermore, the bottom wall 21, the tubular wall 22, the lid wall 23, the rib walls 24 and the overhang wall 25 according to the present reference example are integrally moulded from resin. This configuration can reduce the number of components for the casing 2 including the liquid discharge structure 20, which can reduce the component costs for the casing 2.

Moreover, according to the present reference example, the casing 2 is a casing for an electrical junction box or for a protector which protects a wire harness. With this configuration, the above-described liquid discharge structure 20 is applied to a casing for an electrical junction box or a protector which is oft disposed in a lower portion of a vehicle and thus subject to liquid intrusion from the outside. With such application, the effects and the capacities of this liquid discharge structure 20 can be utilized effectively.

It is to be noted that the reference example as described above merely show representative configurations for the liquid discharge structure, and the liquid discharge structure is not limited thereto, wherein various modifications may be carried out for implementation.

For example, the reference example as described above schematically shows the casing 2 and omit description e.g. of its detailed shape. However, any concrete shape of the casing 2 may be used which includes a bottom wall having a flat plate shape with a through-hole.

Further, the reference example as described above shows the liquid discharge structure 20 with three rib walls 24 by way of example. However, the rib walls 24 are not limited to this number, and any number of rib walls may be selected as appropriate.

Furthermore, the reference example as described above shows by way of example the rib walls 24 which extend across the overall length of the tubular wall 22 and support the lid wall 23 from the outer circumference 232 to the opposite face 233 of the lid wall 23, the opposite face 233 being opposite to the one face 231. However, the rib walls are not limited thereto, and any length and any support configuration of the rib walls may be selected. However, by supporting the lid wall 23 with the rib walls 24 extending across the overall length of the tubular wall 22 from the outer circumference 232 to the opposite face 233 of the lid wall 23, it is possible to increase the structural strength of the liquid discharge structure 20 and suppress liquid entering from the outside better, as described above.

Further, the reference example as described above shows the rib walls 24 in the form of a tapered wall by way of example. However, the rib walls are not limited thereto, and any concrete shape etc. may be selected for the rib walls. However, as described above as well, the rib walls 24 in the form of a tapered wall can reduce the material costs.

Moreover, the reference example as described above shows by way of example that the through-hole 211 is a circular through-hole, the tubular wall 22 is formed in a cylindrical shape, the lid wall 23 is formed in a circular-disk shape, and the overhang wall 25 is formed in a circular-ring shape. However, for individual shapes of these portions, they are not limited to a circular shape etc., and may have any shape as appropriate. However, with these individual portions having a circular shape etc., it is possible to effectively utilize the inner space of the tubular wall as a discharge path while increasing the durability against external pressures, as described above as well.

Further, the reference example as described above shows by way of example that the bottom wall 21, the tubular wall 22, the lid wall 23, the rib walls 24 and the overhang wall 25 are integrally moulded from resin. However, the configuration of the bottom wall, the tubular wall, the lid wall, the rib walls and the overhang wall is not limited thereto. For example, they may be formed separately and combined e.g. by means of adhesive. However, as described above as well, the integral moulding can reduce the number of components and thus the component costs.

Moreover, the reference example as described above shows by way of example that the casing 2 is a casing for an electrical junction box or a protector for protecting a wire harness. However, the casing may be configured for any concrete element as far as it is to be installed in a vehicle. However, by applying the liquid discharge structure 20 to an electrical junction box and/or a protector which is subject to liquid intrusion from the outside, it is possible to effectively utilize the effects and capacities of the liquid discharge structure 20, as described above as well.

REFERENCE SIGNS LIST 1, 2 Casing
10, 20 Liquid discharge structure
11, 21 Bottom wall
12 Blocking wall
13 Vertical walls
14, 27 Discharge path
22 Tubular wall
23 Lid wall
24 Rib walls
25 Overhang wall
26, 111 Discharge openings
121 Long side
122 Short side
123 Lateral sides
141 Front opening
142 Rear opening
211 Through-hole
212 Inner surface
231 One face
232 Outer circumference
233 Opposite face
d11 Gap
d12 Amount of projection
D11, D21 Front-rear direction
D12 Width direction
D22 Axial direction
θ21 Range of angle

What is claimed is:

1. A liquid discharge structure comprising:
    a plate-shaped bottom wall with a discharge opening for liquid, the liquid being collected inside a casing which is configured to be installed in a vehicle;
    a blocking wall outside the bottom wall, wherein the blocking wall is overlapped with the discharge opening in a plan view on the bottom wall and opposed to the bottom wall with a gap between the blocking wall and the bottom wall; and
    a pair of vertical walls extending towards the bottom wall from the blocking wall in a front-rear direction of the vehicle, the pair of vertical walls being opposed to each other in a width direction of the vehicle, wherein the pair of vertical walls is configured to define a discharge path together with the bottom wall and the blocking wall, the discharge path being opened towards both of a front and rear side of the vehicle and configured to discharge the liquid in the front-rear direction, wherein the liquid has passed through the discharge opening.

2. The liquid discharge structure according to claim 1, wherein the discharge path is configured in form of a tapered path with an extension in the width direction, wherein the extension in the width direction is gradually reduced from the front side to the rear side of the vehicle.

3. The liquid discharge structure according to claim 2, wherein the blocking wall is formed in a trapezoid plate shape with a long side located facing the front side of the vehicle and a short side located facing the rear side of the vehicle, and
wherein the pair of vertical walls is walls which each connect one of a pair of lateral sides of the blocking wall to the bottom wall.

4. The liquid discharge structure according to claim 1, wherein the gap between the blocking wall and the bottom wall is smaller than a dimension of the blocking wall in the width direction.

5. The liquid discharge structure according to claim 1, wherein the blocking wall is opposed to the bottom wall so that a central portion of the blocking wall is overlapped with the discharge opening in the plan view.

6. The liquid discharge structure according to claim 1, wherein the bottom wall, the blocking wall and the pair of vertical walls are integrally moulded from resin.

7. The liquid discharge structure according to claim 1, wherein the casing is a casing for an electrical junction box or a protector to be installed in a vehicle, wherein the electrical junction box provides an electrical connection between wire harnesses or between a wire harness and another electric device, wherein the protector to configured to cover and protect a wire harness.

* * * * *